(12) United States Patent
Novis et al.

(10) Patent No.: US 7,970,583 B2
(45) Date of Patent: Jun. 28, 2011

(54) DEGRADED ACTUATOR DETECTION

(75) Inventors: Ari Novis, Rocky Hill, CT (US); Christopher A. Johnson, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 850 days.

(21) Appl. No.: 11/966,065

(22) Filed: Dec. 28, 2007

(65) Prior Publication Data

US 2010/0286959 A1 Nov. 11, 2010

(51) Int. Cl.
*G06F 11/30* (2006.01)
(52) U.S. Cl. ...................................................... 702/183
(58) Field of Classification Search ................... 702/183
See application file for complete search history.

(56) References Cited

U.S. PATENT DOCUMENTS

| | | | |
|---|---|---|---|
| 4,120,469 A | 10/1978 | Westermeier | |
| 4,355,358 A * | 10/1982 | Clelford et al. | 701/3 |
| 4,423,594 A | 1/1984 | Ellis | |
| 5,116,362 A | 5/1992 | Arline et al. | |
| 5,233,512 A * | 8/1993 | Gutz et al. | 700/30 |
| 5,486,997 A | 1/1996 | Reismiller et al. | |
| 5,748,469 A | 5/1998 | Pyotsia | |
| 5,908,176 A | 6/1999 | Gilyard | |
| 5,949,677 A | 9/1999 | Ho | |
| 6,341,238 B1 * | 1/2002 | Modeen et al. | 700/66 |
| 6,347,289 B1 | 2/2002 | VanderLeest | |
| 6,868,325 B2 | 3/2005 | Menon et al. | |
| 7,092,848 B2 | 8/2006 | Hoff et al. | |
| 7,260,501 B2 | 8/2007 | Pattipatti et al. | |
| 7,280,941 B2 | 10/2007 | Bonanni et al. | |
| 7,451,021 B2 * | 11/2008 | Wilson | 701/9 |
| 7,827,001 B2 * | 11/2010 | Schneider et al. | 702/150 |
| 2009/0045296 A1 * | 2/2009 | Cerchie et al. | 244/76 R |

* cited by examiner

*Primary Examiner* — Cindy Hien-Dieu Khuu
(74) *Attorney, Agent, or Firm* — Carlson, Gaskey & Olds PC

(57) ABSTRACT

An actuator control system is disclosed that includes an actuator continuously movable between multiple positions. The controller is configured to command the actuator to a desired actuator position and to apply the command to an actuator model. The controller is configured to compare the modeled and actual actuator positions to determine if the position difference exceeds a fault detection accommodation limit and if the position difference is within a band that is different than the fault detection accommodation limit. The controller is configured to calculate a threshold, which is based upon an estimated load on the actuator. The controller is configured to calculate a band comprised of the threshold applied to the modeled position and to determine if the actual actuator position is within the calculated band. The threshold is calculated at regular intervals, and a fault is declared if the actual actuator position is outside the band for a number of consecutive intervals.

17 Claims, 2 Drawing Sheets

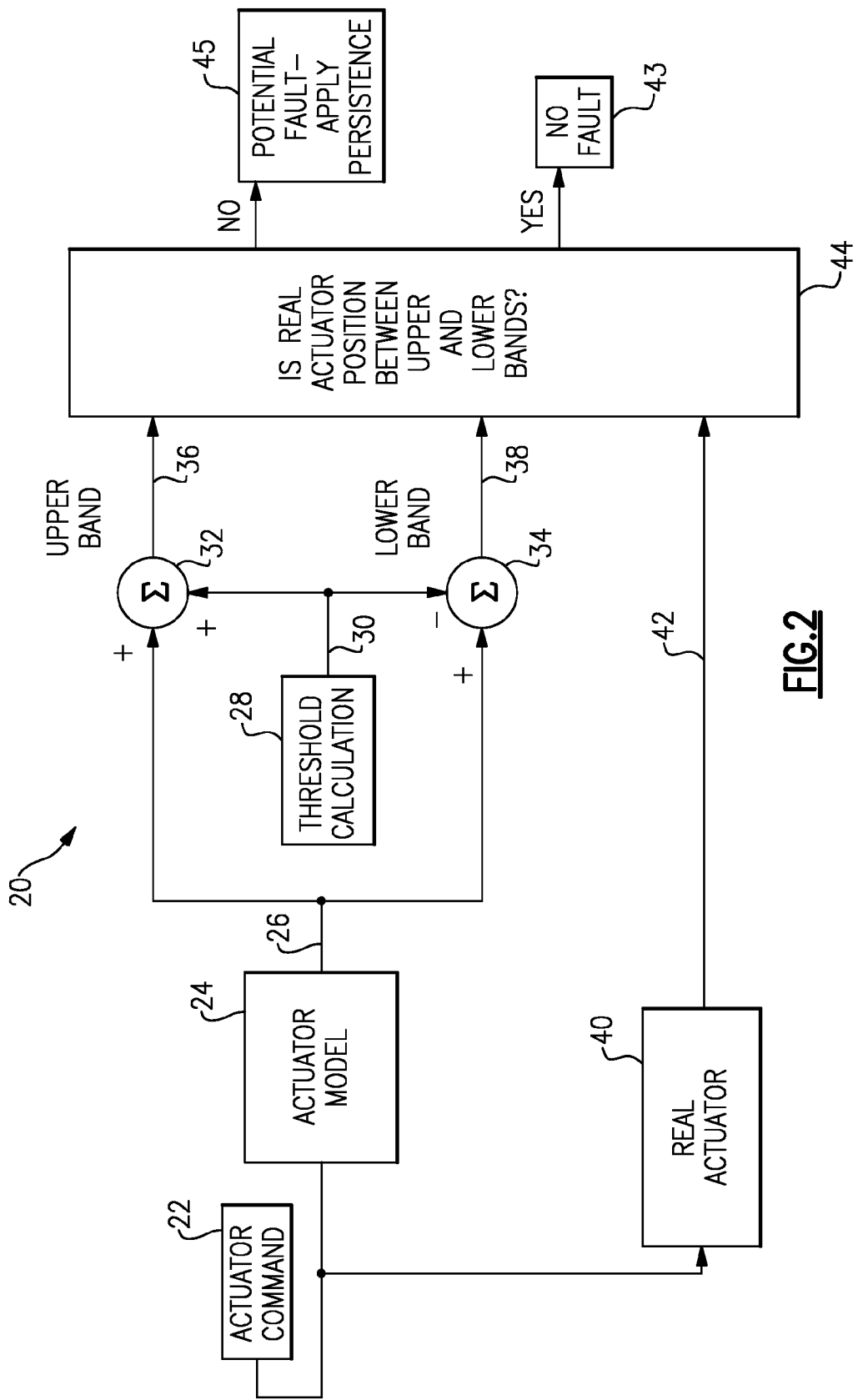

DEGRADED ACTUATOR DETECTION

This invention was made with government support with the United States Navy under Contract No.: N00019-02-C-3003. The government therefore has certain rights in this invention.

BACKGROUND

This disclosure relates to an actuator for use in an aircraft, for example. More particularly, the disclosure relates to an actuator health monitoring system and method.

Electro-hydraulic actuators are used in a number of aerospace applications to translate electrical commands into motion. This motion may be used to move aerodynamic control surfaces, adjust fuel and/or airflow, and the like. Because the proper operation of these actuators is critical to the operation of the system (e.g. aircraft, engine, etc.), it is critical to know the health of the actuation system.

Control systems are designed to be failure tolerant. If a failure is detected, the system is designed such that there is an accommodation that can be taken, either switching to an identical backup system, or other similar mitigation. In the case of flight critical systems, the detection of such faults must be made quickly, usually in a matter of milliseconds. A method commonly used in the art is an open loop failure detection scheme. In this scheme, the actuator position (from a position measuring device) is compared to the commanded position. The actuator is declared failed if the actuator does not move to the commanded position within the designated time frame. Otherwise, it is declared good. There may be a simple actuator model used to improve the fidelity, which is typically termed fault detection and accommodation (FDA), and is well known in the art.

In order to reduce the false alarm rate, the thresholds for this check are usually quite high. This is due to a number of factors. Since the FDA logic is calculated at a high rate, the actuator will not move very much between calculations, so position sensor accuracy and resolution can become large errors. These measurement errors magnify other error sources, such as mechanical loading on the actuator, normal tolerances, etc. In order to have an acceptably low failure rate, the fault threshold has to be set low in order to account for these errors. Typically the actuator has to be running at 50% or less of its normal speed to be declared failed by FDA.

There are many failure modes of actuators and actuation systems that provide advanced warning, such as seal leakage, shorted torque motor coils, binding linkages, abnormally increased loads, clogged hydraulic filters, etc. These failure modes would present themselves as the actuator running at slower than normal speed. It would be useful to be able to reliably detect actuators that were operating in the less than normal but above FDA limit (50%) range in order to replace these actuators or otherwise address the faults, before advancing to the failed state that requires accommodation by the control system.

SUMMARY

An actuator control system is disclosed that includes an actuator continuously movable between multiple positions. A position sensor is configured to detect the multiple positions, which includes an actual actuator position. A controller is in communication with the actuator and the position sensor. The controller is configured to command the actuator to a desired actuator position. The controller is configured to apply the command to an actuator model. The controller is configured to compare the modeled and actual actuator positions to determine if the position difference exceeds a fault detection accommodation limit and if the position difference is within a band that is different than the fault detection accommodation limit. The controller is configured to calculate a threshold. The calculation is based upon an estimated load on the actuator. The controller is configured to calculate a band comprised of the threshold applied to the modeled position. The controller is configured to determine if the actual actuator position is within the calculated band. The threshold is calculated at regular intervals, and a fault is declared if the actual actuator position is outside the band for a number of consecutive intervals.

These and other features of the application can be best understood from the following specification and drawings, the following of which is a brief description.

BRIEF DESCRIPTION OF THE DRAWINGS

This disclosure can be understood by reference to the following detailed description when considered in connection with the accompanying drawings wherein:

FIG. 2 is the overall block diagram of an example degraded actuator detection method.

DETAILED DESCRIPTION

Figure 1:
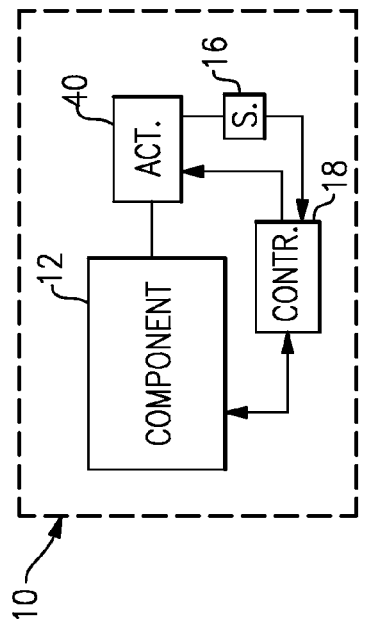
FIG. 1 is a highly schematic view of an actuator control system.

FIG. 1 is a highly schematic view of an actuator control system 10. An actuator 40 controls a component 12. The example components discussed in this disclosure are for an aircraft turbojet engine, but the method is applicable to any closed-loop control system where failure detection is desired. The actuator 40 includes a position sensor 16 that detects the position of a feature associated with the actuator 40, for example, the position of a valve or output rod. The sensor 16 communicates with a controller 18. The controller 18 also communicates with the component 12. The controller 18 commands the actuator to a desired position and monitors the health of the actuator 40. The controller 18 provides a fault if the actuator 40 is degraded so that an accommodation can be made. The controller 18 can be separate or integrated software and/or hardware.

In one example of the method, it is assumed that the actuator 40 is controlled in a typical outer-loop/inner-loop control system, well understood in the art. The controller 18, in the example of an aircraft turbojet engine, a full authority digital engine control (FADEC), commands a change in the position of a valve. One example would be a valve that controls fuel flow, and the change could be from 25% flow to 50% flow. The "outer loop" command is the step change from 25% to 50% flow. The "inner-loop" circuit handles the details of changing the drive to the actuator 40, dealing with the actuator dynamics, etc., in order to accomplish the outer-loop command. The inner-loop circuit can be analog circuitry, digital calculations, or a combination of both.

In one example of the method, it is assumed that the conventional fault detection and accommodation (FDA) is operating simultaneously. Conventional FDA is still desired to detect and accommodate faults that happen suddenly. The example method is intended as a supplement to conventional FDA, for example.

Actuators are available in many different forms, with considerable variation within those forms in terms of speed, accuracy, dynamic response, method of control, etc. The method described is generic for most actuators. However, the details of the method will be specific to a specific actuator based upon, for example, actuator model, dynamics, load characteristics, etc. When the term "actuator model" is used, it is intended to mean the model for the specific actuator on which the method is being employed. The generic method can be used on many different actuators on the same engine, aircraft, or system under control. The actuator models, look-up tables, and thresholds may vary from individual actuator to actuator.

An example method 20 of detecting a degraded actuator is schematically illustrated in FIG. 2. An actuator command 22 is the outer-loop command signal from the FADEC. An actuator model 24 is an analytical model of the dynamics of the actuator. This is typically a first-order model for computational simplicity, and represents the dynamics of an "ideal" actuator. In one embodiment of the method, the degraded actuator detection method is calculated by a digital system, such that the calculations are performed periodically on a regular, set time interval. This time interval is called the calculation time interval, or delta time (DT). In typical control systems, this DT is less than the response time of the actuators, but not so short as to require large amounts of computing power. Typically the DT will be in tens of milliseconds, but the value depends on the system being controlled. The method can also be embodied as a continuous (analog) system. The examples will be for the discrete, digital system.

The output of the actuator model is an expected actuator position 26. This is a position signal the analytical actuator model 24 calculates the actuator to move to under the actuator command 22. An actual actuator position 42 is the output signal of the position sensor 16 on the real, hardware actuator 40. The actuator 40 receives the same outer-loop, actuator command 22 as the actuator model 24.

A threshold value 30 is calculated using the allowable variation between the expected actuator position 26 and the actual actuator position 42. Calculation of the threshold value 30 is schematically shown at 28 is shown in FIG. 2. The threshold value 30 is summed with expected actuator position 26 in sum junction 32 to produce an upper band value 36. The threshold value 30 is subtracted from expected actuator position 26 in sum junction 34 to produce a lower band value 38.

The upper and lower bands values 36, 38 comprise a window of allowable variation around the expected actuator position 26. Decision block 44 compares the actual actuator position 42 with upper and lower band values 36, 38. If the actual actuator position 42 lies within the upper and lower band values 36, 38, the actuator 40 is operating within limits, and no fault is declared, as indicated at block 43.

The example method 20 will detect if the actuator is running faster than the expected rate, in which case it would exceed the upper band 36. While this is a less common failure mode, it is a possible condition, and the degraded actuator method will detect an undesirably fast actuator response time. The following examples will use the more common failure mode of an actuator running slower than desired. The upper band calculation can be omitted if this failure mode is not appropriate for the actuator or system under consideration.

If the actual actuator position 42 lies outside of the upper and lower band values 36, 38, a potential fault is declared, as indicated at block 45. Persistence 45 is applied to the potential fault. Persistence consists of a strategy requiring the fault to be declared for a certain period of time to reduce false alarms from noise and other disturbances. One embodiment of persistence would be for the potential fault to be declared for predetermined events corresponding to, for example, three consecutive DTs in order to trigger an actual fault. If the potential fault is declared for two consecutive DTs, but is clear on the third DT, no actual fault would be declared.

The number of DTs required for the persistence check can be a function of the individual actuator and how it is used. Since the degraded actuator detection method 20 does not require the same immediate answer as FDA because repair can only take effect when the aircraft has landed, the more DTs used in the persistence check, the lower the false alarm rate. However, the degraded actuator detection method 20 is only effective when the actuator is moving. In the example of the fuel valve actuator, the valve can only move between 0% and 100% flow, and is likely to be moved from one set position to another set position, which will take a finite time. If the sum of the persistence check DTs is much greater than that finite time to move from 0% to 100%, a degraded actuator would likely never be detected, because even a slow actuator would reach the end point and stop before the persistence time is complete.

In one example rule of thumb, the sum of the DTs in the persistence calculation 45 should be less than one-half of the stop-to-stop maximum slew rate of the actuator 40. This accounts for actuators that do not move the full range in normal operation. As an example, if the actuator 40 slews from one extreme position to the other in 0.5 seconds, the maximum persistence check time should be 0.25 seconds (one-half of 0.5 seconds). If the DT of the system is 50 milliseconds (0.05 seconds), then the persistence check should be no more than 5 DTs (0.25 seconds divided by DT time of 0.05 seconds). This rule of thumb can be adjusted for the way the actuator is used. If the actuator normally moves full range, the one-half multiplier can be increased, but still less than a value of one. If the actuator normally only moves in small increments, the multiplier will have to be reduced from one-half.

An improvement the example method provides over conventional FDA is that the example method can take a long time to detect a degraded actuator and still provide valuable information. Since the accommodation is a repair or replacement of the actuator after the aircraft has landed, the method can "wait" for a condition ideal for detection that may only occur once or twice in a flight. This allows a longer persistence check (more DTs) and resultant lower false alarm rate. In the example of a turbojet engine fuel valve for a commercial airliner, during most of the flight the fuel valve moves very little. This would require a very short persistence time to detect, resulting in a high false alarm rate. However, at take off, the throttle is advanced sharply, and fuel flow moves from low (idle) to near full open (take off thrust), which would be a large excursion of the valve. Thus, even a long persistence time would catch a degraded actuator. Although the opportunity only happens once per flight, this example would be a candidate for a long persistence time.

Figure 3:
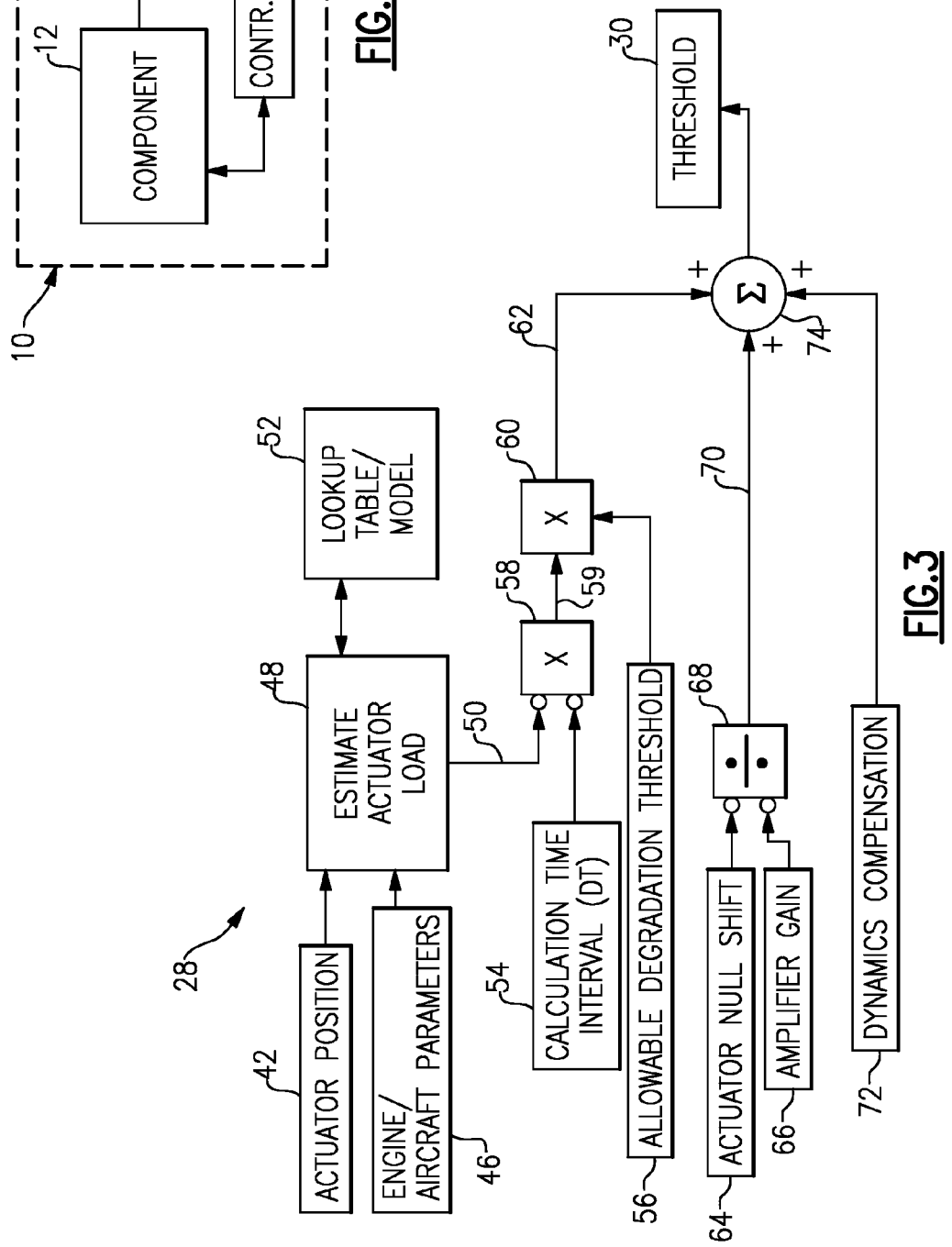
FIG. 3 is a detail of one example threshold calculation used in FIG. 2.

The threshold calculation 28 is shown in FIG. 3. The first step is to calculate the load on the actuator 40. A heavily loaded actuator will run slower than a lightly loaded actuator, and accounting for this difference is used to improve the accuracy of the threshold calculation 28. The threshold calculation 28 comprises three elements: a transient element 62, a steady-state element (or position offset) 70 and a compensation element 72.

To calculate the transient element 62, block 48 estimates the actuator load using inputs of the actuator position 42, other engine/aircraft parameters 46, and a look-up table or model 52. The load on an actuator is typically a function of the actuator position and some other engine or aircraft parameter. In the example of the turbojet engine fuel valve, the force on the valve and the actuator driving it will vary with valve position and fuel pressure. Fuel pressure is usually supplied by a gear-pump driven by an engine spool, so the load would be a function of position and spool speed (engine parameter). In the case of an aircraft control surface, the load would be a function of the position of the surface and the aerodynamic forces on it, which would be related to airspeed and aircraft angle of attack (aircraft parameters).

The actuator position 42 and engine/aircraft parameters 46 are applied to a look-up table or actuator model 52 that provides the maximum actuator slew rate for that set of parameters. The maximum slew rate can be calculated empirically by testing a number of actuators or by analytical analysis of the actuator design constraints. The result is a maximum slew rate for load 50.

The maximum slew rate for load 50 is a velocity. When multiplied by the calculation time DT 54 in multiplier 58, the result is the maximum distance 59 the actuator could move in the time DT, given the load 50. The maximum distance 59 is then multiplied in unit 60 by the allowable degradation threshold 56. The allowable degradation threshold 56 is the value 1 minus the desired fault threshold. As an example, it is desired that an actuator be declared degraded if it moves slower than 80% of the expected rate. Therefore, it is acceptable if it runs between 80% and 100% of the expected rate, which is a maximum allowable degradation of 20%. In this case, the allowable degradation threshold 56 would be 1-0.8, which is 0.2 or 20%. The result of the multiplication in unit 60 is the transient element 62 of the threshold calculation 28.

To calculate the steady state element 70, an actuator null shift 64 is divided by the inner-loop actuator control gain 66 in dividing element 68. The null shift 64 is a characteristic of the individual actuator 40. In an ideal case, a zero command to an actuator will result in zero position. However, due to production tolerances and wear, a zero command to an actuator will result in some actuator offset. The amount of command required to be input in order to result in zero offset is called the null shift, which is the amount off of zero required to "null" the movement. This is calculated by the system by setting the actuator command 22 to zero and measuring the actuator offset. This value is stored by the controller 18. In some embodiments, it may be updated by the controller 18 at regular intervals to account for system wear. The null shift 64 is divided by the actuator inner-loop control gain 66 to produce a position offset 70. This is the distance the actuator 40 would move if the actuator null shift 64 is not accounted for.

The compensation element accounts for any error in the actuator model 24 due to system dynamics. The actuator model 24 is typically a first-order model for computational simplicity, and represents the dynamics of an ideal actuator. However, real actuation systems are typically second order or higher systems. The dynamic compensation 72 is a constant that accounts for some of the error in a first-order representation of a higher-order system. The value of the dynamic compensation is a function of the system dynamics, including time constant(s) of the actuator 40, the implementation of the actuator model 24 and the calculation time interval, DT. In the typical case where the DT is much less than the second-order time constant of the actuator (fast DT, slow actuator), there will be minimal impact from the modeling error and the dynamics compensation value can be set to zero. The dynamic compensation 72 would be used as an adjustment in cases where, due to system design constraints, the system update rate, DT, starts to approach the second and higher order time constants of the actuator 40. This value can be calculated analytically through methods well known in the art, resulting in a simple constant. As an alternative, the fidelity of the actuator model 24 could be improved by making it more complex, but using a pre-determined constant results in less computation with the same results.

Unit 74 is a summation of the transient element 62, steady state element 70, and if required, the dynamics compensation element 72. The output of unit 74 is the threshold value 30 used in FIG. 2.

Although an example embodiment has been disclosed, a worker of ordinary skill in this art would recognize that certain modifications would come within the scope of the claims. For that reason, the following claims should be studied to determine their true scope and content.

What is claimed is:

1. A method of detecting a degraded actuator comprising the steps of:
    a) commanding an actuator to a desired actuator position;
    b) detecting an actual actuator position of the actuator;
    c) comparing the desired and actual actuator positions to determine if the actual actuator position exceeds a fault detection accommodation limit;
    d) comparing the desired and actual actuator positions to determine if the actual actuator position is within a band that is different than the fault detection accommodation limit;
    e) calculating a threshold at a regular interval based upon an estimated load on the actuator;
    f) applying the threshold to adjust the band; and
    g) determining if the actual actuator position is within the adjusted band.

2. The method according to claim 1 comprising the step of applying an actuator model to the desired actuator position prior to the comparing steps to produce an expected actuator position, the comparing steps including comparing the expected and actual actuator positions.

3. The method according to claim 2, wherein the actuator model is based upon a first order system producing an error in the expected actuator position, and step e) includes providing a dynamic compensation constant to reduce the error.

4. The method according to claim 1, wherein the band includes upper and lower bands.

5. The method according to claim 1 comprising the step of triggering a first fault if the fault detection accommodation limit is exceeded, and commanding a system accommodation in response to the first fault.

6. The method according to claim 1 comprising the step of repeating steps e)-g) for a predetermined number of events.

7. The method according to claim 6 comprising the step of triggering a second fault if the actual actuator position is outside the adjusted band for the predetermined number of events.

8. The method according to claim 7, wherein the predetermined number of events is a consecutive number of events.

9. The method according to claim 1 comprising the step of determining actuator load by referencing the actual actuator position relative to an actuator load model and at least one of engine and aircraft parameters.

10. The method according to claim 9, wherein step e) includes multiplying the time interval and the actuator load to produce a maximum distance.

11. The method according to claim 10, wherein step e) includes multiplying an allowable actuator degradation threshold and the maximum distance.

12. The method according to claim 1, wherein the actuator includes an actuator null shift, and step e) includes dividing the actuator null shift by the actuator driver gain to produce a position offset.

13. The method according to claim 1, wherein step e) includes summing transient, steady-state and dynamic elements to produce the threshold.

14. The method according to claim 13, wherein the transient element includes the actuator load multiplied by the time interval.

15. The method according to claim 14, wherein the actuator includes an actuator null shift, and the steady-state element includes dividing the actuator null shift by the actuator gain.

16. The method according to claim 15 comprising the step of applying an actuator model to the desired actuator position prior to the comparing steps to produce an expected actuator position, the comparing steps including comparing the expected and actual actuator positions, wherein the actuator model is based upon a first order system producing an error in the expected actuator position, and wherein the dynamic element includes providing a dynamic compensation to reduce the error.

17. An actuator control system comprising:
an actuator movable between multiple positions;
a position sensor configured to detect the multiple positions, which includes an actual actuator position;
a controller in communication with the actuator and the position sensor, the controller configured to command the actuator to a desired actuator position, wherein the controller is configured to compare the desired and actual actuator positions to determine if the actual actuator position exceeds a fault detection accommodation limit and if the actual actuator position is within a band that is different than the fault detection accommodation limit, wherein the controller is configured to calculate a threshold if the actual actuator position is within the band, the calculation based upon an actuator load on the actuator, and wherein the controller is configured to apply the threshold to adjust the band and determine if the actual actuator position is within the adjusted band.

* * * * *